(12) United States Patent
Adkisson

(10) Patent No.: US 7,857,265 B1
(45) Date of Patent: Dec. 28, 2010

(54) SWINGING MOUNT FOR FLAT PANEL TV

(76) Inventor: Jeffrey F. Adkisson, 6144 Mossycup Ct., Loveland, CO (US) 80538

( * ) Notice: Subject to any disclaimer, the term of this patent is extended or adjusted under 35 U.S.C. 154(b) by 183 days.

(21) Appl. No.: 12/072,049

(22) Filed: Feb. 22, 2008

(51) Int. Cl.
*A47F 5/00* (2006.01)
(52) U.S. Cl. .................... 248/125.7; 248/445; 248/921
(58) Field of Classification Search .............. 248/415, 248/445, 317, 333, 125.7, 125.1, 125.9, 921, 248/291.1; D6/462
See application file for complete search history.

(56) References Cited

U.S. PATENT DOCUMENTS

| 1,088,764 | A | * | 3/1914 | Booth | ......................... | 359/854 |
| 2,485,135 | A | * | 10/1949 | Blumenstock | .............. | 248/453 |
| 3,889,910 | A | * | 6/1975 | Walters | ................... | 248/122.1 |
| 7,040,591 | B1 | * | 5/2006 | Simon | ......................... | 248/458 |

* cited by examiner

*Primary Examiner*—Gwendolyn Baxter
(74) *Attorney, Agent, or Firm*—William E. Hein

(57) ABSTRACT

A mounting mechanism for a flat panel TV or other flat panel viewing device permits vertical positioning as well as swinging, swiveling, and tilting positioning of the flat panel viewing device.

10 Claims, 3 Drawing Sheets

SWINGING MOUNT FOR FLAT PANEL TV

BACKGROUND AND SUMMARY OF THE INVENTION

This invention relates generally to brackets for mounting flat panel TVs and monitors and, more particularly, to a mounting mechanism that permits vertical positioning, as well as swinging, swiveling, and tilting positioning of the flat panel viewing device.

Flat panel TV mounts on the market today involve very complex, expensive articulating mechanisms or, if simpler in construction, they provide only minimal adjustment and travel, thereby limiting their ability to accommodate a wide range of positions from which a user may wish to view the screen.

It would therefore be advantageous to provide a simple, yet effective fully adjustable mounting mechanism for flat panel TVs and viewing devices that allows a user to comfortably view the screen from standing, seated or recumbent positions.

In accordance with the illustrated preferred embodiment of the present invention, an adjustable mounting mechanism includes an inverted u-shaped tubular swing arm having a proximal depending leg and a distal depending leg. A straight tubular swing arm extension is coupled to a lower end of the proximal depending leg of the swing arm by means of a tubular coupler stub at the juncture therebetween to permit rotational motion of the proximal depending leg of the swing arm with respect to the swing arm extension. A longitudinal open-ended tubular mounting bracket is fixedly attached in a vertical position to an environmental structural member, such as a bedwall of a bedroom adjacent one side of a bed positioned therein, for retaining the swing arm extension in a fixed vertically-adjustable position. A swivel and tilt bracket is coupled to a rear surface of the flat panel viewing device and to the lower end of the distal depending leg of the swing arm to permit motion of the flat panel viewing device about horizontal and vertical axes.

DESCRIPTION OF THE PREFERRED EMBODIMENT

Figure 1:
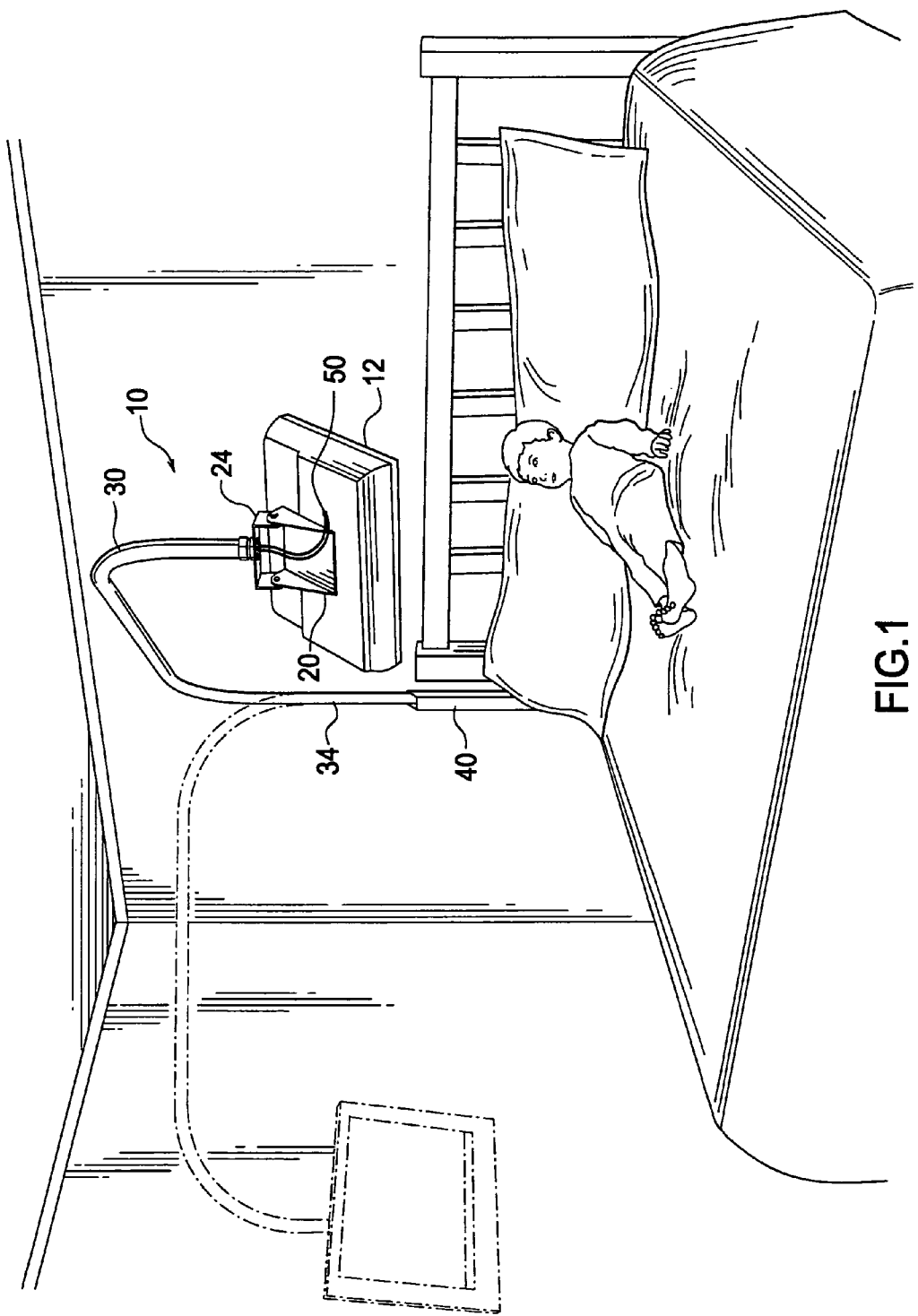
FIG. 1 is a pictorial diagram illustrating the way in which a flat panel TV coupled to the mounting mechanism of the present invention can be moved to a position that permits a user lying in bed to comfortably view the screen of the TV.

Referring now to FIG. 1, there is shown a mounting mechanism 10 contracted in accordance with the present invention. Mounting mechanism 10 permits a flat panel TV 12 to be quickly and easily positioned for viewing by a user lying in bed, for example, and to just as easily be swung out of the way against a bedroom wall, as shown in phantom. Of course, flat panel TV 12 may be moved to any desired position intermediate or beyond the two positions illustrated in FIG. 1, subject only to the structural limitations of the environment in which the mounting mechanism 10 is located.

Figure 2:
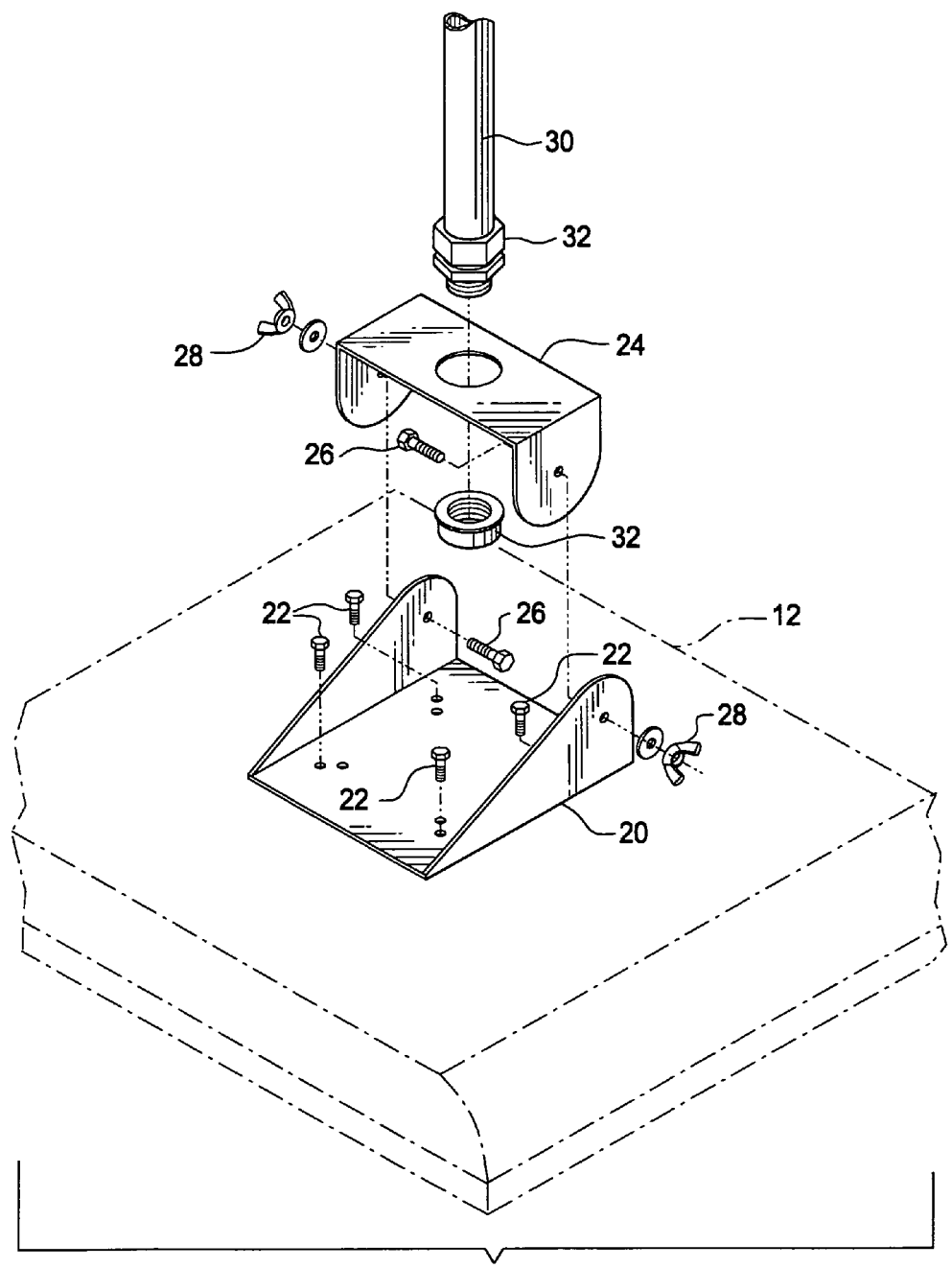
FIG. 2 is a detailed assembly diagram illustrating the attachment of a swivel and tilt bracket to the back surface of a conventional flat panel TV and also to an upper swing arm of the mounting mechanism of the present invention.
Figure 3:
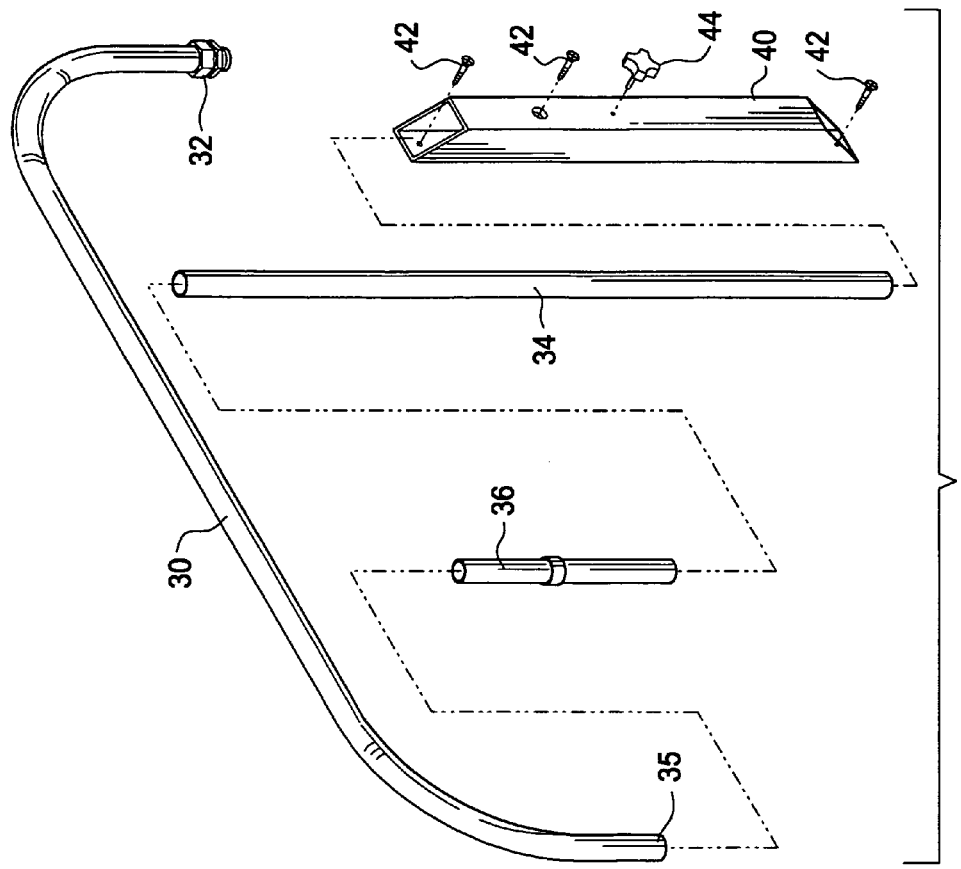
FIG. 3 is a detailed assembly diagram of a wall mount bracket, a lower swing arm, a swing arm coupler, and the upper swing arm components of the flat panel TV mounting mechanism of the present invention.
Figure 4:
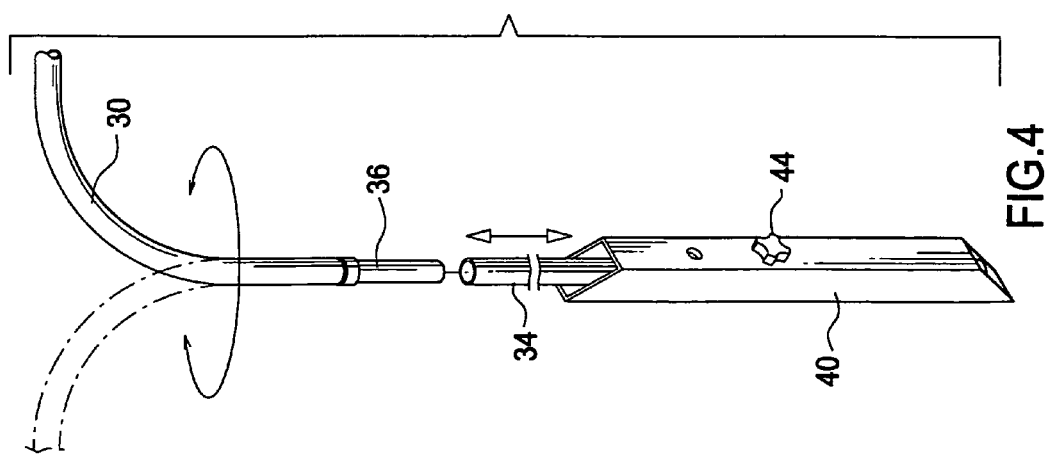
FIG. 4 is a pictorial diagram illustrating how the upper swing arm rotates with respect to the lower swing arm and how the height of the upper swing arm and, hence, the TV, is set by raising or lowering the lower swing arm within the wall mount bracket.

Referring additionally to FIGS. 2-4, a lower tilt bracket component 20 is mounted to the rear surface of a conventional flat panel TV 20 by means of four bolts 22 threaded into mounting holes typically provided on the rear surface of commercially available flat panel TVs. An upper tilt bracket component 24 is mounted to outwardly extending flanges of lower tilt bracket component 20 by means of a pair of bolts 26 and wing nuts 28. Wing nuts 28 permit securing lower tilt bracket component 20 and upper tilt bracket component 24 in a position that provides a desired tilt angle for optimal viewing of flat panel TV 12. An outer end of an inverted U-shaped upper swing arm 30 is attached to upper tilt bracket 24 through a central opening therein by means of conventional swivel connector components 32 that allows flat panel TV 12 to be swiveled about the axis of the downwardly extending outer end of upper swing arm 30 to a desired viewing position. Upper swing arm 30 may be formed, for example, of a length of conventional electrical metallic tubing (EMT) of a chosen diameter. A lower swing arm 34 may comprise a straight length of EMT of the same diameter as upper swing arm 30. Lower swing arm 34 is removably attached to a downwardly extending inner end 35 of upper swing arm 30 by means of a coupler stub 36 that fits within upper swing arm 30 and lower swing arm 34 so as to permit rotational motion therebetween. Lower swing arm 34 is positioned within a wall mount bracket 40 that may comprise a length of conventional square tubing. Wall mount bracket 40 may be mounted to a wall or other structural member by means of a plurality of screws 42. The ends of wall mount bracket 40 may be beveled to permit access to mounting holes provided therein to accept upper and lower ones of screws 42. An adjusting bolt 44 permits the user to adjust lower swing arm 34 upwardly or downwardly and then tighten the adjusting bolt against lower swing arm 34 in order to set the height of flat panel TV mounting mechanism 10 and, hence, the height of flat panel TV 12 itself.

Any signal or power cables 50 required for operation of flat panel TV 12 may be conveniently and unobtrusively routed through the bottom end of lower swing arm 34 and through upper swing arm 30.

I claim:

1. A mounting mechanism for a flat panel viewing device, the mechanism comprising:

an inverted u-shaped swing arm having a proximal depending leg and a distal depending leg;

a straight swing arm extension coupled to a lower end of said proximal depending leg of said swing arm to permit rotational motion of said proximal depending leg of said swing arm with respect to said swing arm extension;

a longitudinal open-ended mounting bracket fixedly attached in a vertical position to an environmental structural member, said mounting bracket being adapted for retaining said swing arm extension in a fixed vertically-adjustable position; and a swivel and tilt bracket coupled to a rear surface of said flat panel viewing device and to a lower end of said distal depending leg of said swing arm, said swivel and tilt bracket permitting motion of said flat panel viewing device about a vertical axis of said distal depending leg of said swing arm and about a horizontal axis of said swivel and tilt bracket, said swivel and tilt bracket comprising a lower member having a flat surface for attachment to said flat panel viewing device and having left and right outwardly protruding flange members, said swivel and tilt bracket further comprising an upper member coupled to said lower end of said distal depending leg of said swing arm to permit rotational motion of said upper member about the vertical axis of said distal depending leg of said swing arm, said upper member having left and right outwardly protruding flange members coupled to said left and right outwardly protruding flange members of said lower member, said coupling comprising said horizontal axis of said swivel and tilt bracket.

2. A mounting mechanism as in claim 1, wherein said flat panel viewing device comprises a flat panel TV.

3. A mounting mechanism as in claim 1, wherein said flat panel viewing device comprises a flat panel monitor.

4. A mounting mechanism as in claim 1, wherein said swing arm and said swing arm extension are tubular.

5. A mounting mechanism as in claim 4, further comprising a tubular coupler stub positioned within said swing arm and said swing arm extension at a juncture therebetween.

6. A mounting mechanism as in claim 1, wherein said mounting bracket is tubular.

7. A mounting mechanism as in claim 6, wherein the tubular mounting bracket is square in cross section.

8. A mounting mechanism as in claim 1, wherein said mounting bracket is attached to a wall of a building.

9. A mounting mechanism as in claim 8, wherein said mounting bracket is attached to a bedwall of a bedroom adjacent one side of a bed positioned in the bedroom.

10. A mounting mechanism for a flat panel viewing device, the mechanism comprising:
- an inverted u-shaped swing arm having a proximal depending leg and a distal depending leg;
- a straight swing arm extension coupled to a lower end of said proximal depending leg of said swing arm to permit rotational motion of said proximal depending leg of said swing arm with respect to said swing arm extension;
- a coupler stub positioned within said swing arm and said swing arm extension at a juncture therebetween;
- a longitudinal open-ended mounting bracket fixedly attached in a vertical position to an environmental structural member, said mounting bracket being adapted for retaining said swing arm extension in a fixed vertically-adjustable position; and
- a swivel and tilt bracket coupled to a rear surface of said flat panel viewing device and to a lower end of said distal depending leg of said swing arm, said swivel and tilt bracket permitting motion of said flat panel viewing device about a vertical axis of said distal depending leg of said swing arm and about a horizontal axis of said swivel and tilt bracket.

* * * * *